(12) United States Patent
Webster et al.

(10) Patent No.: US 7,460,317 B2
(45) Date of Patent: Dec. 2, 2008

(54) DIGITAL CAMERA MODULE WITH IMPROVED IMAGE QUALITY

(75) Inventors: Steven Webster, Miao-li (TW); Ying-Cheng Wu, Miao-li (TW); Ching-Lung Jao, Miao-li (TW)

(73) Assignee: Altus Technology Inc., Chu-Nan, Miao-Li Hsien (TW)

( * ) Notice: Subject to any disclaimer, the term of this patent is extended or adjusted under 35 U.S.C. 154(b) by 164 days.

(21) Appl. No.: 11/450,649

(22) Filed: Jun. 9, 2006

(65) Prior Publication Data

US 2007/0008631 A1    Jan. 11, 2007

(30) Foreign Application Priority Data

Jul. 9, 2005    (CN)    ............ 2005 1 0035910

(51) Int. Cl.
*G02B 7/02*    (2006.01)
(52) U.S. Cl. ............... 359/811; 359/813; 359/819
(58) Field of Classification Search ........ 359/811, 359/812, 813, 815, 817–819, 821, 822, 823, 359/826, 827; 348/340, 355

See application file for complete search history.

(56) References Cited

U.S. PATENT DOCUMENTS

| 6,985,313 | B1 * | 1/2006 | Savage, Jr. | 359/819 |
| 7,091,571 | B1 * | 8/2006 | Park et al. | 257/432 |
| 7,196,857 | B2 * | 3/2007 | Kazama | 359/811 |
| 2006/0181633 | A1 * | 8/2006 | Seo | 348/340 |

* cited by examiner

*Primary Examiner*—Timothy J Thompson
(74) *Attorney, Agent, or Firm*—Steven M. Reiss

(57) ABSTRACT

A digital camera module (100) includes a lens barrel (20), a lens holder (22), an image pick-up module (26), and a protective member. The lens barrel defines a central hollow, and has at least one lens (202) received therein. The lens holder defines a central hollow. The lens barrel is movably received in the lens holder along an axis of the lens holder. The image pick-up module is arranged to receive light from the lenses. The protective member is configured for preventing dust and/or particle contamination associated with a relative movement of the lens barrel and the lens holder falling onto the image pick-up module.

9 Claims, 2 Drawing Sheets

DIGITAL CAMERA MODULE WITH IMPROVED IMAGE QUALITY

BACKGROUND OF THE INVENTION

1. Field of the Invention

The present invention relates generally to digital camera modules and, more particularly, to a digital camera module which improves image quality.

2. Discussion of the Related Art

Generally, digital cameras are image recording media capable of photographing a plurality of still images without using film. Such a digital camera typically uses an image pickup device, which is a kind of semiconductor device, such as a charge coupled device (CCD) or complementary metal oxide semiconductor (CMOS). In the digital camera, an object image formed on the image pickup device through a lens is converted into an electrical signal by the image pickup device, and the electrical signal is stored as a digital signal in a mobile phone or PDA in which the digital camera is mounted.

A digital camera module, as shown in FIG. 3, a lens barrel 10, a lens holder 12, and an image pick-up module 14. The lens barrel 10 has an external thread 102, and the lens holder 12 has an internal thread 122. The lens barrel 10 is received in the lens holder 12 via the thread engagement between the external thread 102 and the internal thread 122. The image pick-up module 14 includes a base plate 142 and an image pick-up chip 144. The lens holder 12 is fixed on the base plate 142. During auto focusing, a distance between the lens barrel 10 and the image pick-up chip 144 is slightly adjusted to make the digital camera module focus by means of adjusting the thread engagement of the internal thread 122 of the lens holder 12 and the external thread 102 of the lens barrel 10. Lastly, the lens holder 12 is secured on the base plate 142 via adhesive.

However, dust and/or particle pollution/contamination associated with friction between the lens barrel 10 and the lens holder 12 may fall onto the image pick-up chip 144, thus affecting image quality of the digital camera module.

What is needed, therefore, is a digital camera module which overcomes the above-described problem.

SUMMARY OF THE INVENTION

A digital camera module comprises a lens barrel, a lens holder, an image pick-up module, and a protective member. The lens barrel is hollow, and has at least one lens received therein. The lens holder is hollow. The lens barrel is movably received in the lens holder along an axis of the lens holder. The image pick-up module is arranged to receive a light from the lenses. The protective member is configured for preventing dust and/or particles associated by friction between the lens barrel and the lens holder falling onto the image pick-up module.

Other advantages and novel features will become more apparent from the following detailed description when taken in conjunction with the accompanying drawings.

BRIEF DESCRIPTION OF THE DRAWINGS

Many aspects of the digital camera module can be better understood with reference to the following drawings. The components in the drawings are not necessarily drawn to scale, the emphasis instead being placed upon clearly illustrating the principles of the present digital camera module. Moreover, in the drawings, like reference numerals designate corresponding parts throughout the several views.

DETAILED DESCRIPTION OF PREFERRED EMBODIMENTS

Figure 1:
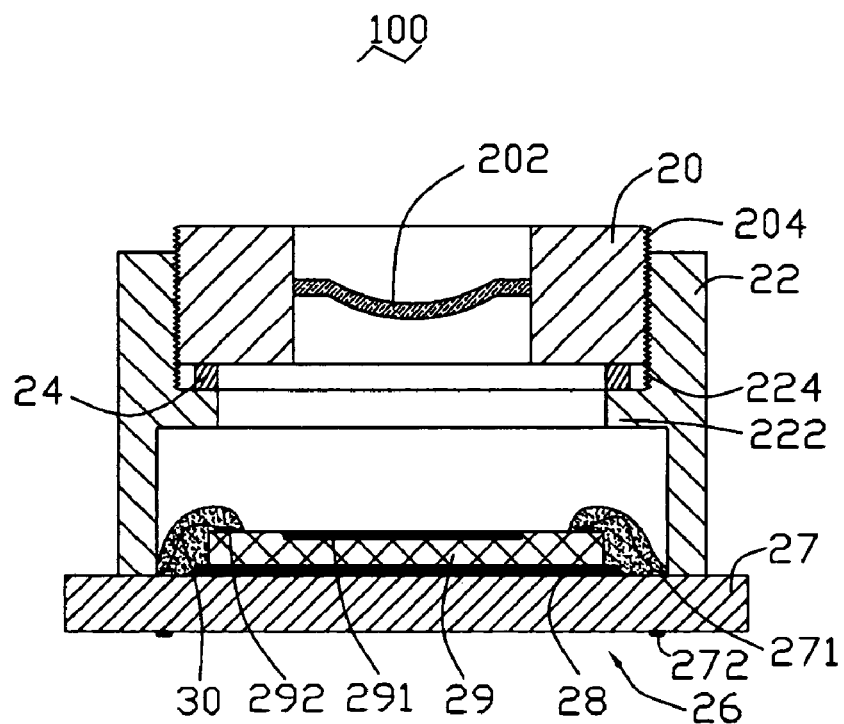
FIG. 1 is a schematic view of a digital camera module, in accordance with a first exemplary embodiment.

Referring now to the drawings, FIG. 1 shows a digital camera module 100 according to a first preferred embodiment. The digital camera module 100 is adapted for use in a portable electronic device (not shown), such as a mobile phone or a Personal Digital Assistance (PDA), but the compact nature thereof could prove useful in compact digital camera units or digital camcorders. The digital camera module 100 includes a lens barrel 20, a lens holder 22, a ring member 24 as a protective member, and an image pick-up module 26.

The lens barrel 20 is a hollow cylinder in shape, with two open ends so that light can be transmitted therethrough. The lens barrel 20 has a plurality of lenses 202 (only one shown) received therein. The lens barrel 20 has an external thread 204 defined in an outer periphery thereof.

The lens holder 22 is a hollow cylinder with two open ends allowing light to be transmitted therethrough. The lens holder 22 has a raised lip 222 projecting from middle portion of an inner periphery thereof. The lens holder 22 has an internal thread 224 defined in an inner periphery thereof, corresponding to the external thread 204 of the lens barrel 20.

The ring member 24 is annular in shape, and supported by the raised lip 222 of the lens holder 22.

The image pick-up module 26 includes a base plate 27, an adhesive means 28, an image pick-up chip 29, and a plurality of bonding wires 30. The base plate 27 is made of a material such as a plastic, a ceramic or a fibrous composite. The base plate 27 has a plurality of top pads 271 on a top surface, a plurality of bottom pads 272 on a bottom surface thereof. The bottom pads 272 are positioned corresponding to and electrically connecting with the respective top pads 271. The base plate 27 is used for electrically connecting the image pick-up chip 29 to other printed circuit boards.

The image pick-up chip 29 is adhered to the top surface of the base plate 27 via the adhesive means 28. A top side of the image pick-up chip 29 is arranged with a photosensitive area 291 and a plurality of chip pads 292 around the photosensitive area 291.

The bonding wires 30 are made of a conductive material such as gold or aluminum alloy. One end of each bonding wire 30 is connected/joined with a respective chip pad 292 of the image pick-up chip 29, and the other end of the bonding wires 30 is connected/joined with a respective top pad 271 of the base plate 27.

In assembling the digital camera module 100, the ring member 24 is received in the lens holder 22 via an open end of the lens holder 22, and supported by the raised lip 222. Then, the lens barrel 20 is placed in the lens holder 22, with the external thread 204 of the lens barrel 20 engaging with the internal thread 224 of the lens holder 22. Then, the lens holder 22 is fixed on the image pick-up module 24, with the image pick-up chip 29 received in the lens holder 22 and the lens holder secured on the base plate 27. During auto focusing, a distance between the lens barrel 20 and the image pick-up chip 29 can be adjusted to focus the digital camera module 100 by adjusting the thread engagement of the external thread 204 of the lens barrel 20 and the internal thread 224 of the lens holder 22.

In the first embodiment, since the ring member 24 is disposed between the lens barrel 20 and the lens holder 22, dust and/or particle pollution/contamination associated with friction between the lens barrel 20 and the lens holder 22 can be effectively prevented from entering the image pick-up module 26. In addition, the ring member 24 may be tightly sandwiched between the lens barrel 20 and the lens holder 22.

Figure 2:
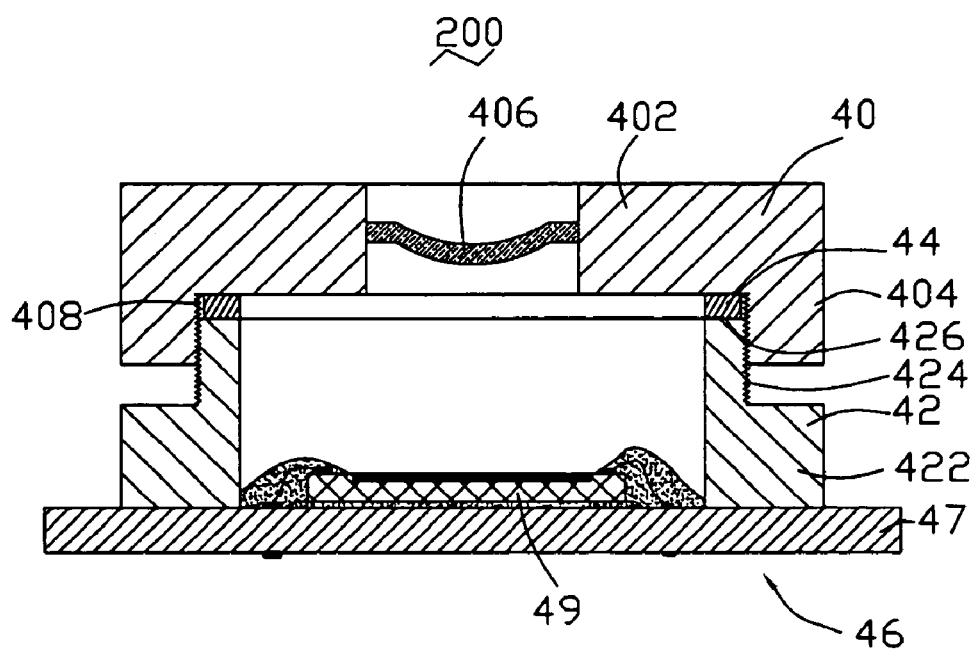
FIG. 2 is a schematic view of a digital camera module, in accordance with a second exemplary embodiment.
Figure 3:
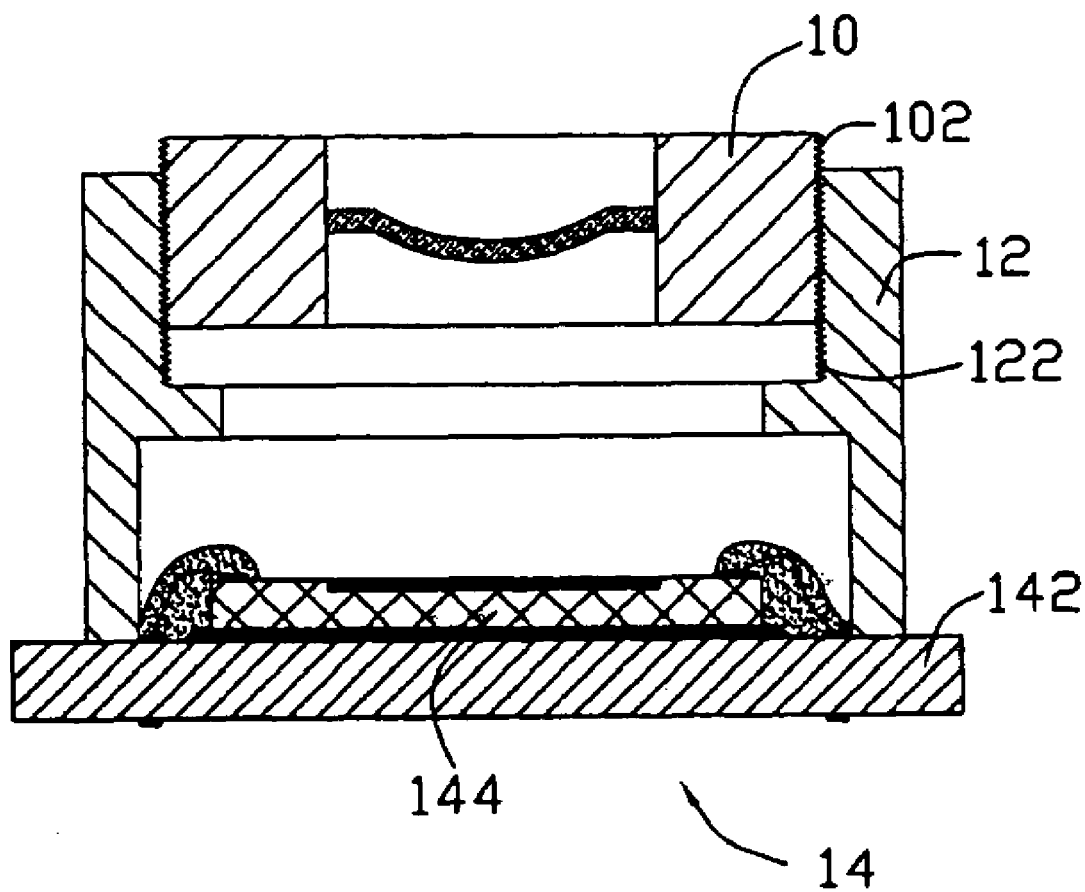
FIG. 3 is an schematic view of a typical digital camera module.

Referring to FIG. 2, another digital camera module 200 according to a second preferred embodiment is provided. The digital camera module 200 includes a lens barrel 40, a lens holder 42, a ring member 44 as a protective member, and an image pick-up module 46. The image pick-up module 46 is similar to the image pick-up module 26 of the first embodiment, and include a base plate 47, and an image pick-up chip 49 disposed on the base plate 47.

The lens barrel 40 is a hollow cylinder in shape with two open ends so that light can be transmitted therethrough. The lens barrel 40 includes a first cylinder portion 402, and a second cylinder portion 404 integrally formed with the first cylinder portion 402. An inner diameter of the first cylinder portion 402 is smaller than that of the second cylinder portion 404. The first cylinder portion 402 has a plurality of lenses 406 (only one shown) received therein. The second portion 404 has an internal thread 408 defined in an inner periphery thereof.

The lens holder 42 is a hollow cylinder with two open ends so that light can be transmitted therethrough. The lens holder 42 has a projecting stage 422 projecting from outer periphery thereof adjacent a bottom thereof. The lens holder 42 has an external thread 424 defined in an outer periphery thereof, corresponding to the internal thread 408 of the lens barrel 40.

The ring member 44 is ring-shaped, and disposed on a top surface 426 of the lens holder 42. The ring member 24 is tightly sandwiched between the lens barrel 40 and the top surface 426 of the lens holder 42.

In assembling the digital camera module 200, the protective member 44 is disposed on the top surface 426 of the lens holder 42. The lens barrel 40 is placed around the lens holder 42, with the internal thread 408 engaging with the external thread 424 of the lens holder 42. Then, the lens holder 42 is fixed on the image pick-up module 46, with the image pick-up chip 49 of the image pick-up module 46 received in the lens holder 42 and the lens holder secured on the base plate 47. During auto focusing, a distance between the lens barrel 40 and the image pick-up chip 49 is adjusted to focus the digital camera module 200 by adjusting the thread engagement of the external thread 408 of the lens barrel 40 and the internal thread 424 of the lens holder 42.

In the second embodiment, since a protective member 40 is disposed between the lens barrel 40 and the top surface of the lens holder 42, dust and/or particle pollution/contamination in associated with friction between the lens barrel 40 and the lens holder 42 can be effectively prevented entering the image pick-up module 46. In addition, the thread engagement between the lens barrel 40 and the lens holder 42 disposed on an outer periphery of the lens holder 42 on the image pick-up chip 49 can also prevent particle or dust from falling onto the image pick-up chip 49, thus improving image quality of the digital camera module.

In alternative embodiment, the protective member may be a circular washer, or other member of other shape having a hole in a center thereof such that a light from the lenses can be transmitted through the protective member to the image pick-up module. An outer diameter of the protective member may be equal to an inner diameter of the lens holder. The protective member may be integrally formed with the lens holder.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A digital camera module, comprising:
   a lens barrel defining a central hollow, and having at least one lens received therein;
   a lens holder defining a central hollow, the lens barrel movably mounted with the lens holder along an axis of the lens holder;
   an image pick-up module being arranged to receive a light from the lens; and
   a protective member positioned between and contacting opposing surfaces of the lens barrel and the lens holder, and positioned for preventing dust and/or particle contamination associated with friction between the lens barrel and the lens holder from falling through the central hollow of the lens holder and onto the image pick-up module.

2. The digital camera as claimed in claim 1, wherein the protective member is annular.

3. The digital camera module as claimed in claim 2, wherein the lens barrel has an internal thread defined in an inner periphery thereof, and the lens holder has an external thread defined in an outer periphery thereof, the internal thread of the lens barrel engaging with the external thread of the lens holder.

4. The digital camera module as claimed in claim 3, wherein the lens barrel has a first cylinder portion and a second cylinder portion, a diameter of the second cylinder portion is greater than that of the first cylinder portion, the internal thread being defined in the second cylinder portion.

5. The digital camera module as claimed in claim 1, wherein the image pick-up module comprises a base plate, and an image pick-up chip secured on the base plate, the lens holder being secured on the base plate.

6. The digital camera module as claimed in claim 5, wherein the image pick-up chip has a plurality of chip pads arranged on a top side thereof, the base plate has a plurality of top pads arranged on a top surface, and a plurality of bottom pads arranged on a bottom surface on an opposite side of the base plate to the top surface, the chip pads of the image pick-up chip electrically connect with corresponding top pads of the base plate via a plurality of bonding wires.

7. A digital camera module, comprising:
   a lens barrel having an internal thread defined in an inner periphery thereof, and at least one lens received therein;
   a lens holder having an external thread defined in an outer periphery thereof, the external thread engaging with the internal thread of the lens barrel;
   a ring member having a hole in a center thereof for transmitting light therethrough, the ring member positioned between and in contact with opposing surfaces of the lens holder and the lens barrel; and
   an image pick-up module being arranged to receive light from the lenses;
   wherein the ring member is positioned for preventing dust and/or particle contamination associated with friction between the lens barrel and the lens holder from falling through the lens holder and onto the image pick-up module.

8. The digital camera module as claimed in claim 7, wherein the lens barrel has a first cylinder portion and a second cylinder portion, a diameter of the second cylinder portion is greater than that of the first cylinder portion, the internal thread defined in the second cylinder portion.

9. The digital camera module as claimed in claim 7, wherein the ring member is annular.

* * * * *